(No Model.)

E. CHILDS.
ANTIFRICTION HUB OR WHEEL BEARING.

No. 604,003. Patented May 10, 1898.

Witnesses:
Walter O. Lombard
Fred S. Greenleaf

Inventor:
Eugene Childs,
by Crosby & Gregory
Attys.

THE NORRIS PETERS CO., PHOTO-LITHO., WASHINGTON, D. C.

UNITED STATES PATENT OFFICE.

EUGENE CHILDS, OF BOSTON, MASSACHUSETTS, ASSIGNOR TO EDWARD O. ELY, OF SAME PLACE.

ANTIFRICTION HUB OR WHEEL BEARING.

SPECIFICATION forming part of Letters Patent No. 604,003, dated May 10, 1898.

Application filed December 17, 1897. Serial No. 662,300. (No model.)

*To all whom it may concern:*

Be it known that I, EUGENE CHILDS, of Boston, county of Suffolk, and State of Massachusetts, have invented an Improvement in Antifriction Hub or Wheel Bearings, of which the following description, in connection with the accompanying drawings, is a specification, like letters on the drawings representing like parts.

This invention is intended as an improvement on United States Patent No. 586,535, dated July 13, 1897. That patent shows a circular unbroken hub provided with an internal annular groove in which is placed loosely a series of segments, the concaved faces of said segments when in place in the groove of the hub entering a series of annular grooves made in a series of rollers mounted in open notches of a bearing-ring. This invention has especially to do with improvements on the devices shown, whereby the said segments may be readily put in place and retained therein against liability of getting out of working position. To this end I have cut a slot through the outer wall of said hub, said slot intersecting the annular groove at the inner side of said hub, said slot being for the insertion of said segments from the outside of said hub into the annular groove within the hub, said segments being inserted one after the other, and when all are inserted the said slot is closed by a keeper.

Figure 1:
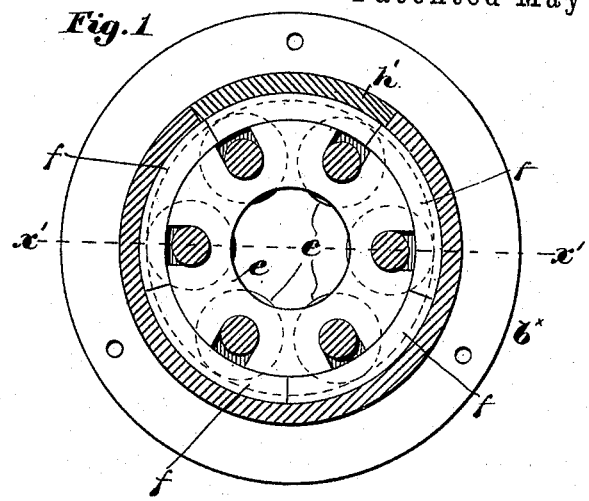
Figure 2:
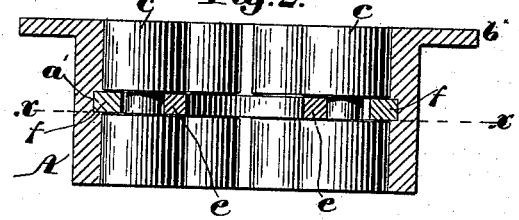
Figure 3:
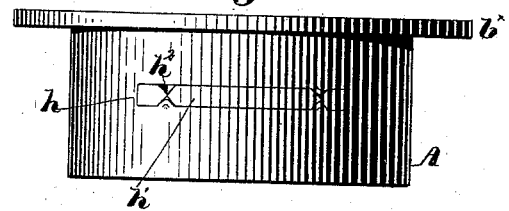
Figure 4:
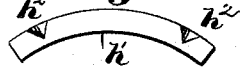

Figure 1 is a horizontal section of my improved hub in the line $x$, Fig. 2. Fig. 2 is a vertical section in the line $x'$, Fig. 1. Fig. 3 is a side elevation of the device shown in Figs. 1 and 2, and Fig. 4 shows the keeper detached.

The body or hub A, having the annular interior groove $a'$, the segments $f$, placed in said groove, the notched bearing-ring $e$, and the rollers $c$, having annular grooves to leave necks to enter the notches of said bearing-ring and to be entered by the concaved edges of the said segments, are and may be all as shown in said patent, so need not be herein further described further than to say that herein instead of two ears extended from said body A, I have shown a flange $b^\times$.

In accordance with my invention I have cut a slot $h$ through the body A into and to intersect the annular groove $a'$, and after the rollers have been put into the bearing-ring and placed in the hollow body with the grooves of the rollers opposite the groove $a'$ I then put one segment $f$ after another into said slot, passing the said segments along in said groove until it is full of segments, and then I fill the slot $h$ with a keeper $h'$, it in this instance of my invention being shown as a segmental strip of brass or other suitable metal having notches $h^2$, said keeper being kept firmly in place, if desired, by the use of a prick-punch, or, in other words, a prick-punch may be set against the body A opposite a notch $h^2$ and the punch be struck a blow, which will result in driving some of the metal of the body A into a notch $h^2$. Any other suitable means for locking the keeper in place may be employed, if desired.

By inserting the segments from the outside through the slot $h$ it is possible to use a wider segment than in the patent referred to, and the segments may be of a width to fill fully the space between the bottom of the annular groove and the edge of the bearing-ring $e$, as best shown in Fig. 1.

Having fully described my invention, what I claim, and desire to secure by Letters Patent, is—

A hub-bearing of the class described, it being composed of a hollow body provided with an internal annular groove, said body being slotted externally to intersect a part of said annular groove; a set of rollers having annular grooves, and a bearing-ring; combined with a series of segments inserted through said external slot and entering the annular groove of said body and also the grooves of said rollers; and a keeper to close said slot and prevent the escape of said segments, substantially as described.

In testimony whereof I have signed my name to this specification in the presence of two subscribing witnesses.

EUGENE CHILDS.

Witnesses:
GEO. W. GREGORY,
MARGARET A. DUNN.